US011255751B2

(12) United States Patent
Worden et al.

(10) Patent No.: US 11,255,751 B2
(45) Date of Patent: *Feb. 22, 2022

(54) VEHICLE SENSOR ASSEMBLY HAVING A RADIO FREQUENCY (RF) SENSOR TO WIRELESSLY COMMUNICATE DATA TO OUTSIDE THE VEHICLE SENSOR ASSEMBLY

(71) Applicant: Transportation IP Holdings, LLC, Norwalk, CT (US)

(72) Inventors: Bret Worden, Erie, PA (US); Jingjun Zhang, Lawrence Park, PA (US); David Petersen, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 142 days.

This patent is subject to a terminal disclaimer.

(21) Appl. No.: 16/695,259

(22) Filed: Nov. 26, 2019

(65) Prior Publication Data

US 2020/0096419 A1 Mar. 26, 2020

Related U.S. Application Data

(63) Continuation of application No. 15/370,505, filed on Dec. 6, 2016, now Pat. No. 10,527,523.

(Continued)

(51) Int. Cl.
*G01M 17/06* (2006.01)
*G01M 15/12* (2006.01)
(Continued)

(52) U.S. Cl.
CPC ............. *G01M 15/12* (2013.01); *G01D 11/30* (2013.01); *G01K 1/08* (2013.01); *G01K 1/14* (2013.01);
(Continued)

(58) Field of Classification Search
CPC ............ G01K 1/08; G01K 1/14; G01K 13/00; G01M 17/013; G01M 17/06; G01M 17/10

See application file for complete search history.

(56) References Cited

U.S. PATENT DOCUMENTS 5,473,941 A * 12/1995 Judd ....................... G01P 1/023
73/514.34
7,191,055 B2 * 3/2007 Miyakoshi ............ F01L 1/3442
701/114

(Continued)

FOREIGN PATENT DOCUMENTS

EP 1213564 A2 12/2002

OTHER PUBLICATIONS

Examination report No. 1 dated Apr. 1, 2020 for corresponding Australian Patent Application No. 2016273953.

(Continued)

*Primary Examiner* — Eric S. McCall
(74) *Attorney, Agent, or Firm* — The Small Patent Law Group LLC; Christopher R. Carroll

(57) ABSTRACT

A sensor assembly includes a housing extending from an insertion end to an opposite coupling end, from a sensor end to an opposite back end, and from a top end to an opposite bottom end. The assembly also includes a sensor dish outwardly projecting from the sensor end of the housing and configured to hold one or more sensors. The assembly also includes a radio frequency (RF) transparent sensor cap configured to be secured to the sensor dish to secure the one or more sensors within the sensor dish. The housing also can be secured to a vehicle for the sensors to measure operational conditions of the vehicle. The housing of the sensor (Continued)

assembly may be connected to a drive train of the vehicle by inserting a fastener through a channel in the housing and into a jacking hole of the vehicle.

19 Claims, 10 Drawing Sheets

Related U.S. Application Data

(60) Provisional application No. 62/269,265, filed on Dec. 18, 2015.

(51) Int. Cl.
    *G01D 11/30*     (2006.01)
    *G01K 1/14*     (2021.01)
    *G01K 1/08*     (2021.01)
    *H04Q 9/00*     (2006.01)
    *G01K 13/00*     (2021.01)
    *G01P 15/08*     (2006.01)

(52) U.S. Cl.
    CPC .......... *G01K 13/00* (2013.01); *G01P 15/0802* (2013.01); *H04Q 9/00* (2013.01); *G01K 2205/00* (2013.01); *H04Q 2209/40* (2013.01)

(56) References Cited

U.S. PATENT DOCUMENTS

| | | | | |
|---|---|---|---|---|
| 8,024,980 B2 * | 9/2011 | Arms | ................... | G01L 5/0004 73/763 |
| 2001/0008090 A1 * | 7/2001 | Murai | ................... | G01L 23/222 73/756 |
| 2002/0189365 A1 * | 12/2002 | Blakesley | ............... | G01L 5/103 73/826 |
| 2006/0186875 A1 | 8/2006 | Schroeder et al. | | |
| 2006/0207312 A1 * | 9/2006 | Kuno | ..................... | G01H 11/08 73/35.11 |
| 2007/0157699 A1 * | 7/2007 | Manlove | ................. | G01P 1/023 73/12.01 |
| 2011/0138924 A1 * | 6/2011 | Colombo | ............ | G01L 19/0038 73/756 |
| 2011/0282540 A1 | 11/2011 | Armitage et al. | | |
| 2012/0292469 A1 | 11/2012 | Miekley et al. | | |
| 2012/0304715 A1 * | 12/2012 | Gore | ..................... | G08B 13/04 70/344 |
| 2013/0104627 A1 * | 5/2013 | Hagio | .................. | G01L 23/222 73/35.11 |
| 2013/0320997 A1 * | 12/2013 | Whiteley | ................. | G01H 3/00 324/629 |
| 2015/0362391 A1 * | 12/2015 | Suzuki | .................. | G01L 9/0055 137/511 |
| 2016/0076973 A1 * | 3/2016 | White | ..................... | B60T 8/171 73/115.08 |

OTHER PUBLICATIONS

Examination Report No. 2 dated Jul. 21, 2020 for corresponding Australian Patent Application No. 2016273953.
Office Action for corresponding European Application No. 16203512. 5-1215 dated Nov. 28, 2019.
Office Action dated Dec. 28, 2020 for corresponding Chinese Patent Application No. 201611167737.8.
English translation of the Office Action dated Dec. 28, 2020 for corresponding Chinese Patent Application No. 201611167737.8.
First Examination Report dated Feb. 10, 2021 for corresponding Indian Patent Application No. 201644043179 (6 pages).

* cited by examiner

VEHICLE SENSOR ASSEMBLY HAVING A RADIO FREQUENCY (RF) SENSOR TO WIRELESSLY COMMUNICATE DATA TO OUTSIDE THE VEHICLE SENSOR ASSEMBLY

CROSS-REFERENCE TO RELATED APPLICATIONS

This application is a continuation of U.S. application Ser. No. 15/370,505 now U.S. Pat. No. 10,527,523 filed on 6 Dec. 2016), which claims priority to U.S. Provisional Application No. 62/269,265, filed 18 Dec. 2015. The entire disclosures of these applications are incorporated herein by reference.

FIELD

Embodiments of the subject matter disclosed herein relate to sensors used to monitor operational characteristics of powered systems, such as vehicles.

BACKGROUND

Various systems can include sensors for monitoring characteristics of the systems and/or surroundings of the systems. For example, vehicle systems, stationary power systems, etc., can include several sensors monitoring the same or different characteristics. These sensors can monitor vibrations, temperatures, states, or the like, of the systems in order to track operation of the systems, identify unsafe conditions, determine when maintenance or repair of the systems are needed, or to achieve other objectives. The data provided by the sensors may be used for one or more purposes to control operation and/or monitor health of the vehicles.

The accuracy of the measurements provided by sensors can depend on the locations of the sensors in the powered system. For example, a temperature sensor may provide more accurate temperature measurements of a location in a powered system when the sensor is closer to the location than when the sensor is located elsewhere in the powered system. As another example, an accelerometer can provide more accurate measurements of movement of a component in a powered system when the accelerometer is closer to and/or connected with the component than when the accelerometer is farther from and/or separated from the component.

But, some powered systems provide little to no room for sensors in some locations. For example, while it may be desirable to place a temperature sensor, accelerometer, or other type of sensor in a location onboard a vehicle that is on or close to the interface between the wheels and the route being traveled upon, there may not be room for placing sensors in this location. Moreover, the extreme conditions experienced by these locations can limit or prohibit the addition of sensors in the locations.

BRIEF DESCRIPTION

In one embodiment, a sensor assembly includes one or more sensors configured to measure one or more operational conditions of a vehicle and a housing extending from an insertion end to an opposite coupling end and having an internal chamber configured to hold the one or more sensors. The housing also includes a channel extending through the housing from the insertion end to the coupling end. The channel is configured to receive a connector that extends through the channel and connects with the vehicle to secure the housing to the vehicle.

In one embodiment, a sensor assembly includes a housing extending from an insertion end to an opposite coupling end, extending from a sensor end to an opposite back end, and from a top end to an opposite bottom end. Each of the sensor end, the back end, the top end, and the bottom end intersects both the insertion end and the coupling end. The assembly also includes a sensor dish outwardly projecting from the sensor end of the housing. The sensor dish is configured to hold one or more sensors. The assembly also includes a radio frequency (RF) transparent sensor cap configured to be secured to the sensor dish to secure the one or more sensors within the sensor dish. The housing also can be configured to be secured to a vehicle for the one or more sensors to measure one or more operational conditions of the vehicle.

In one embodiment, a sensor assembly includes a housing that is elongated from an insertion end to an opposite coupling end. The insertion end is configured to receive a connector into a channel extending through the housing from the insertion end to the coupling end. The coupling end is configured to engage a motor assembly of a vehicle to which the connector secures the housing. The channel of the housing is configured to receive the connector without being secured to one or more threads of the connector. The assembly can include one or more sensors configured to measure one or more operational conditions of the vehicle.

In one embodiment, a sensor assembly kit includes a connector, one or more sensors configured to measure one or more operational conditions of a vehicle, and a housing extending from an insertion end to an opposite coupling end and having an internal chamber configured to hold the one or more sensors. The housing also includes a channel extending through the housing from the insertion end to the coupling end. The channel is configured to receive the connector. The connector is configured to extend through the channel and connect with an existing aperture in the vehicle to detachably secure the housing to the vehicle.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

One or more embodiments of the inventive subject matter described herein provide sensor assemblies and methods that can monitor movement (e.g., vibrations) of one or more components of vehicles. In one embodiment, the assemblies and methods provide for sensors mounted to motor assemblies of vehicles to measure vibrations of the motor assemblies. The measured vibrations can be used to identify damage to bearings of the motors in the motor assemblies, predict when damage will occur to the bearings, or the like. The severe environment of wheel/axle combinations in vehicles (such as locomotives) can cause bearing failures in the traction motors to be a significant disruption to railroad traffic. Monitoring bearing health is a cost-effective solution to reduce the impact of these failures.

In one aspect, the assemblies and methods described herein provide integrated sensor housings that allow a sensor to be mounted to a U-tube structure of a motor housing without alterations to the existing U-tube or motor housing structure. The sensor assembly can mount to the U-tube structure using an existing opening, such as a jacking hole that is otherwise used to insert a jack for lifting the motor assembly. This type of mounting allows for a quick one-bolt installation without the need for drilling or welding on the existing structure of the motor assembly. The direct connection to the U-tube allows direct transmission of both vibration and thermal signatures of the motor assembly to the sensor assembly, where more accurate measurements of vibrations and/or temperatures may occur relative to placing the sensor assemblies in other locations.

Figure 1:
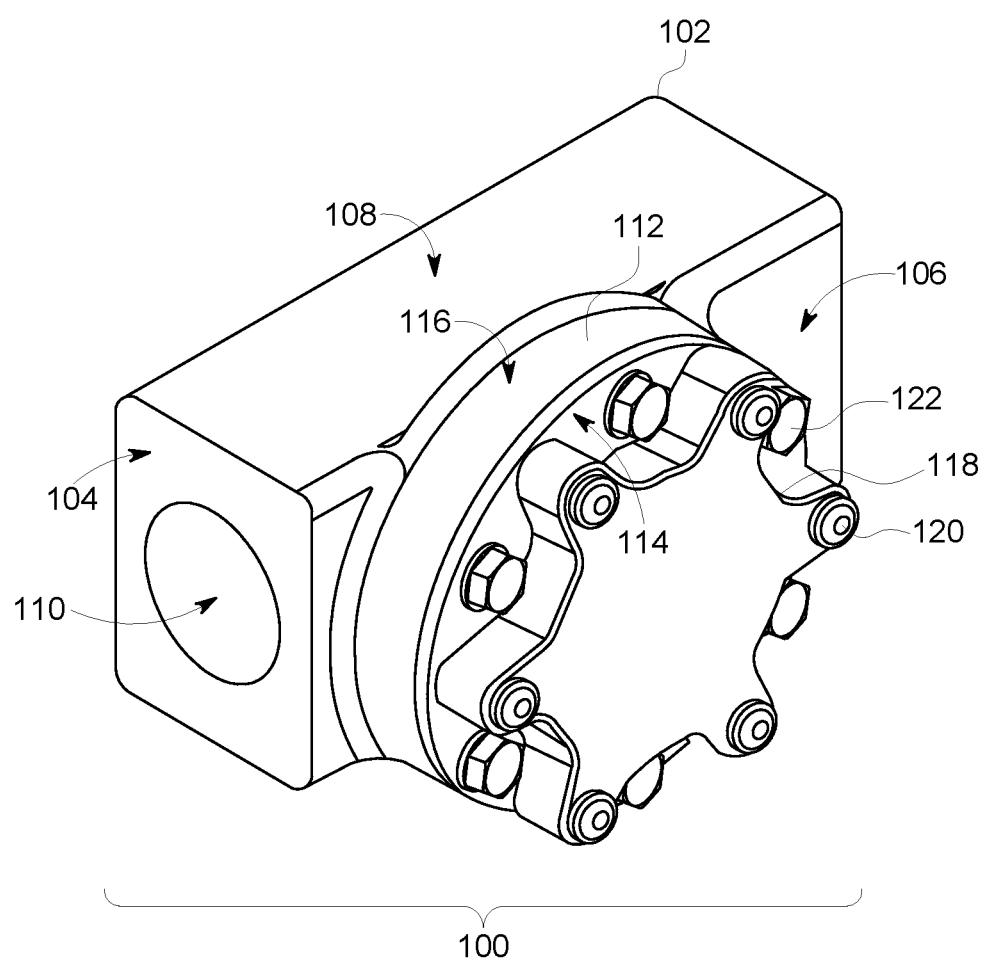
FIG. 1 illustrates a perspective view of a sensor assembly.
Figure 2:
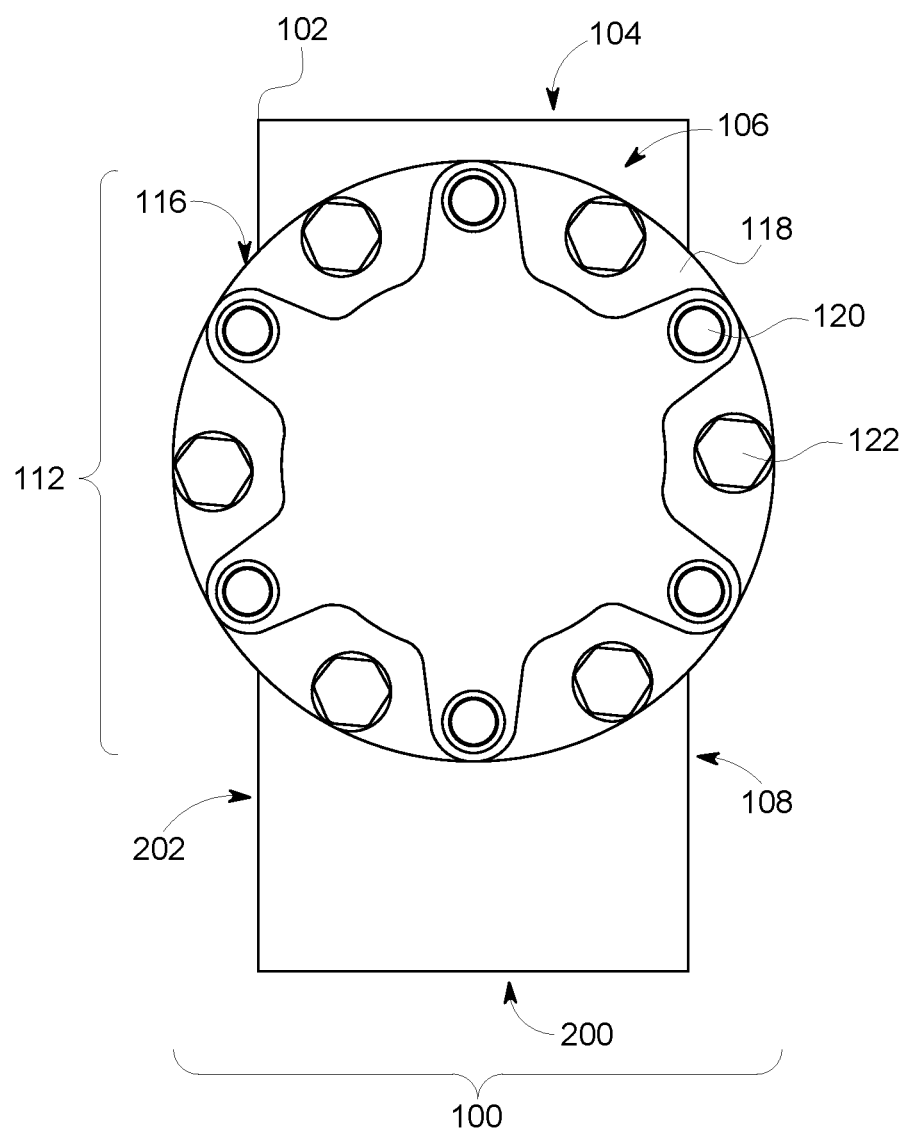
FIG. 2 illustrates a front view of the sensor assembly shown in FIG. 1.
Figure 3:
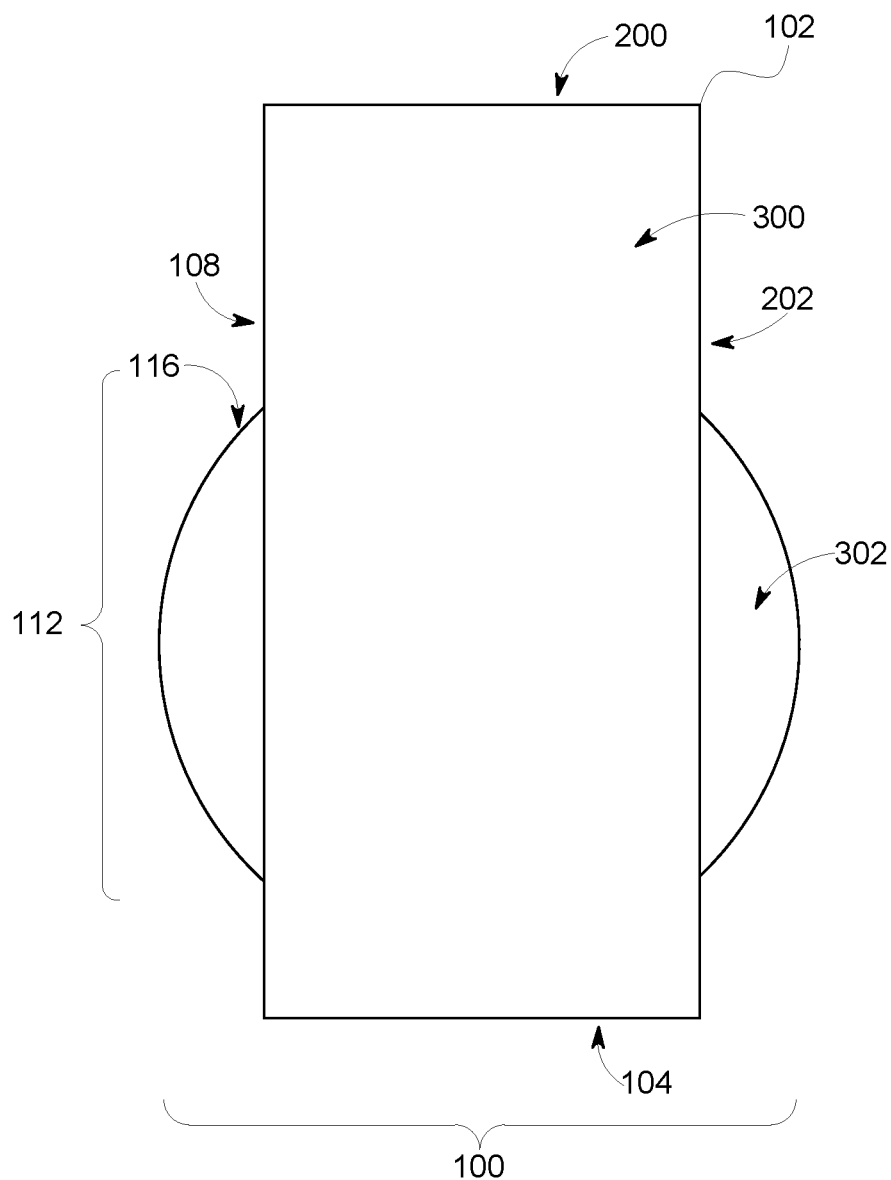
FIG. 3 illustrates a rear view of the sensor assembly shown in FIG. 1.
Figure 4:
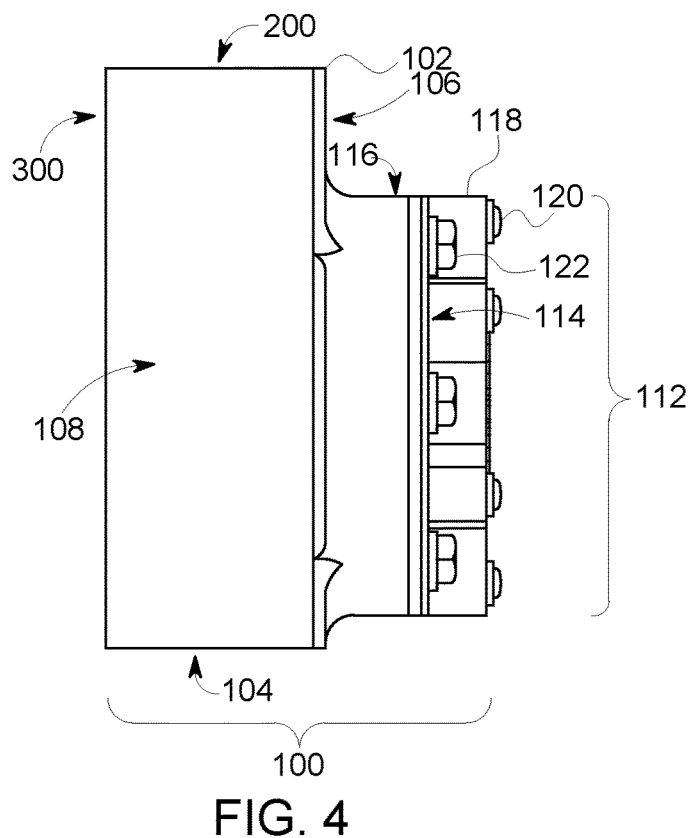
FIG. 4 illustrates a top view of the sensor assembly shown in FIG. 1.
Figure 5:
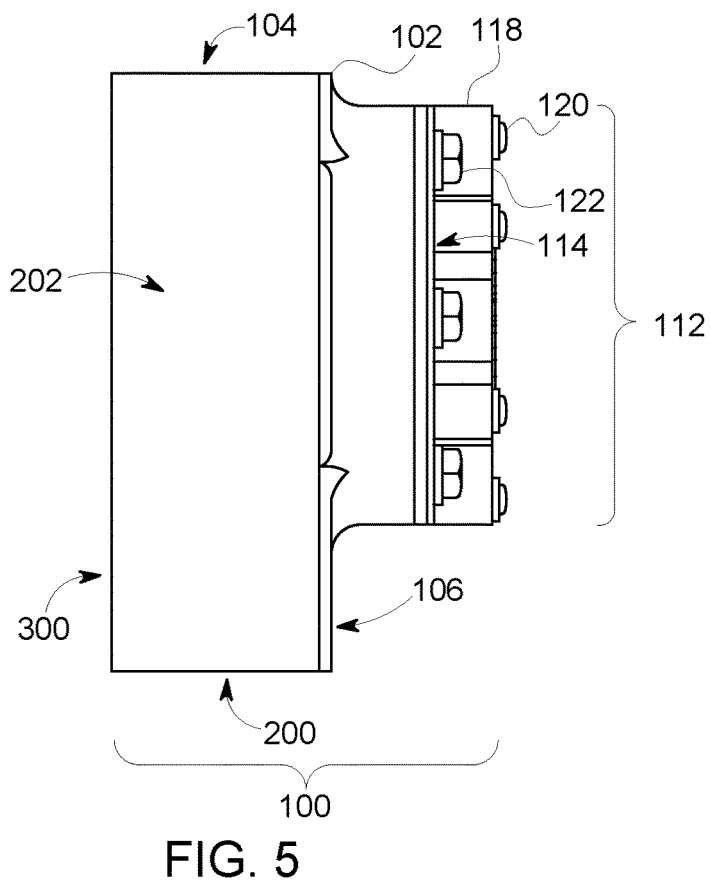
FIG. 5 illustrates a bottom view of the sensor assembly shown in FIG. 1.
Figure 6:
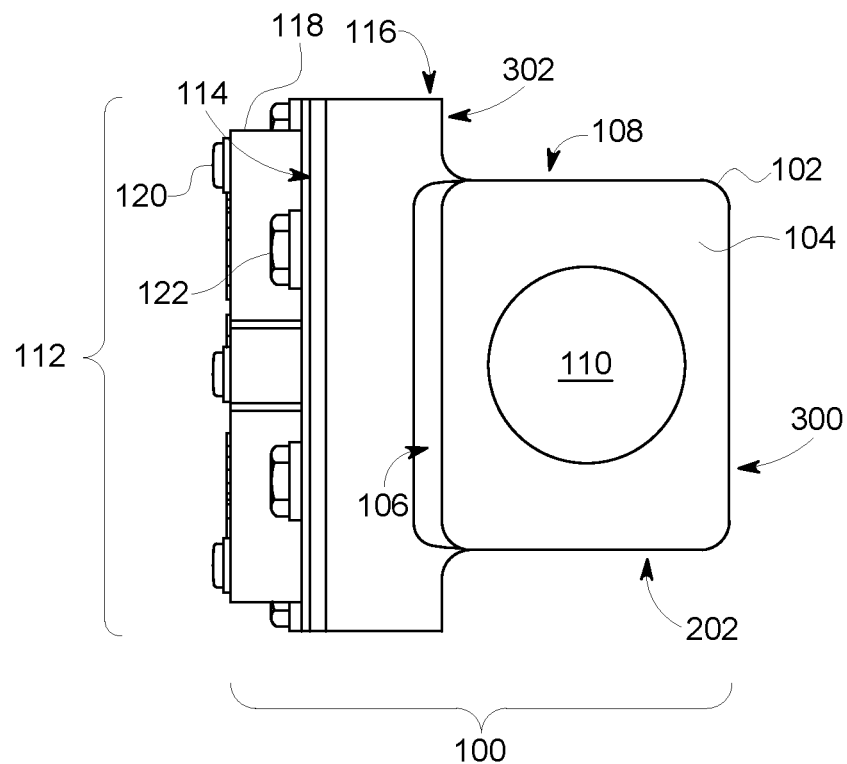
FIG. 6 illustrates a left view of the sensor assembly shown in FIG. 1.
Figure 7:
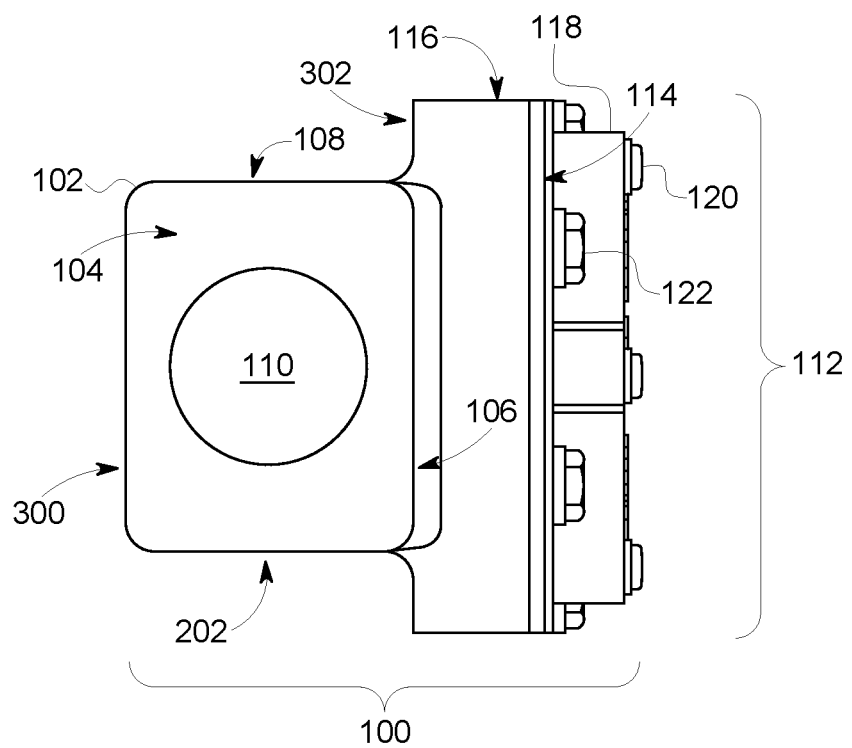
FIG. 7 illustrates a right view of the sensor assembly shown in FIG. 1.

FIGS. 1 through 7 illustrate one embodiment of a sensor assembly 100. FIG. 1 illustrates a perspective view of the sensor assembly 100, FIG. 2 illustrates a front view of the sensor assembly 100, FIG. 3 illustrates a rear view of the sensor assembly 100, FIG. 4 illustrates a top view of the sensor assembly 100, FIG. 5 illustrates a bottom view of the sensor assembly 100, FIG. 6 illustrates a left view of the sensor assembly 100, and FIG. 7 illustrates a right view of the sensor assembly 100. The sensor assembly 100 includes a housing 102 that extends from an insertion end or surface 104 to an opposite coupling end or surface 200 (shown in FIG. 2). The housing 102 also extends from a sensor end or surface 106 to an opposite back end or surface 300 (shown in FIG. 3), and from a first end or surface 108 to an opposite, second end or surface 202 (shown in FIG. 2).

The housing 102 includes a connector channel 110 that extends through the housing 102 from the insertion end 104 to the coupling end 200. In one embodiment, the connector channel 110 is a hole extending through the housing 102 that does not include a threaded surface (e.g., the channel 110 is threadless). Alternatively, the connector channel 110 may include one or more threads. As described herein, a connector may be inserted through the connector channel 110 and coupled with a motor assembly to secure the sensor assembly 100 to the motor assembly. The connector may be a threaded connector that is secured to the motor assembly by a threaded connection. The connector channel 110 may not have threads so that the orientation of the sensor assembly 100 can be controlled by an operator installing the sensor assembly 100 regardless of the relative positions of the threads on the connector and the threads on the motor assembly.

The housing 102 includes a sensor dish 112 extending outward from the sensor end 106. The sensor dish 112 includes a relatively shallow container of the housing 102 that holds one or more sensors in the housing 102. The sensor dish 112 extends from a front end or surface 114 to an opposite, back end or surface 302 (shown in FIG. 3) along the same or similar direction that the housing 102 extends from the sensor end 106 to the back end 300. The sensor dish 112 may have a circular side wall 116 that extends from the front end 114 to the back end 302. Alternatively, the sensor dish 112 may have another shape or size. The sensor dish 112 may be relatively shallow in that the distance from the front end 114 to the back end 302 may be smaller than the distance between any two opposite ends of the housing 102.

A radio frequency (RF) transparent sensor cap 118 is connected with the front end 114 of the sensor dish 112 to enclose the sensor or sensors within the sensor dish 112 by several connectors 120, 122. The sensor cap 118 may protect the sensors in the sensor dish 112 from damage and external environmental conditions, such as dirt, dust, moisture, and the like. The RF transparent cap may allow RF transmissions to pass through the sensor cap with minimal or reduced signal attenuation (e.g., relative to other types of materials).

Figure 8:
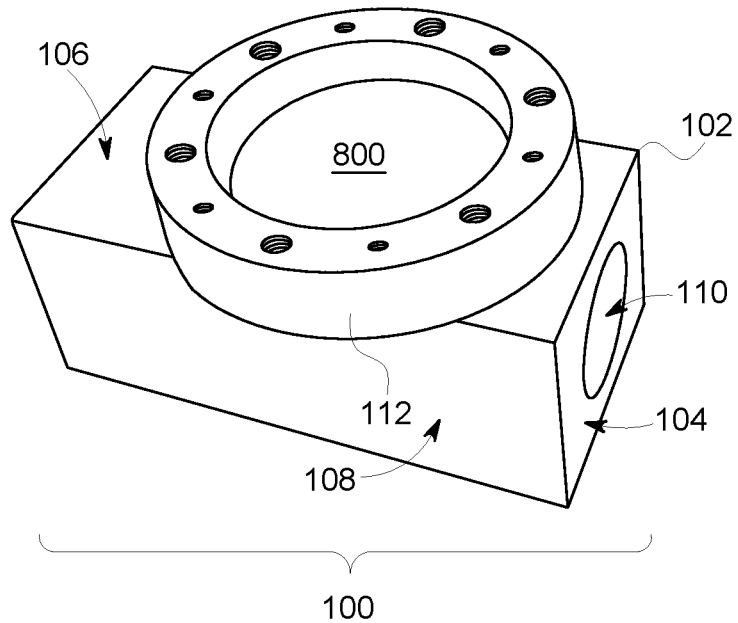
FIG. 8 illustrates a perspective view of the sensor assembly shown in FIG. 1 with a sensor cap shown in FIG. 1 removed according to one embodiment
Figure 9:
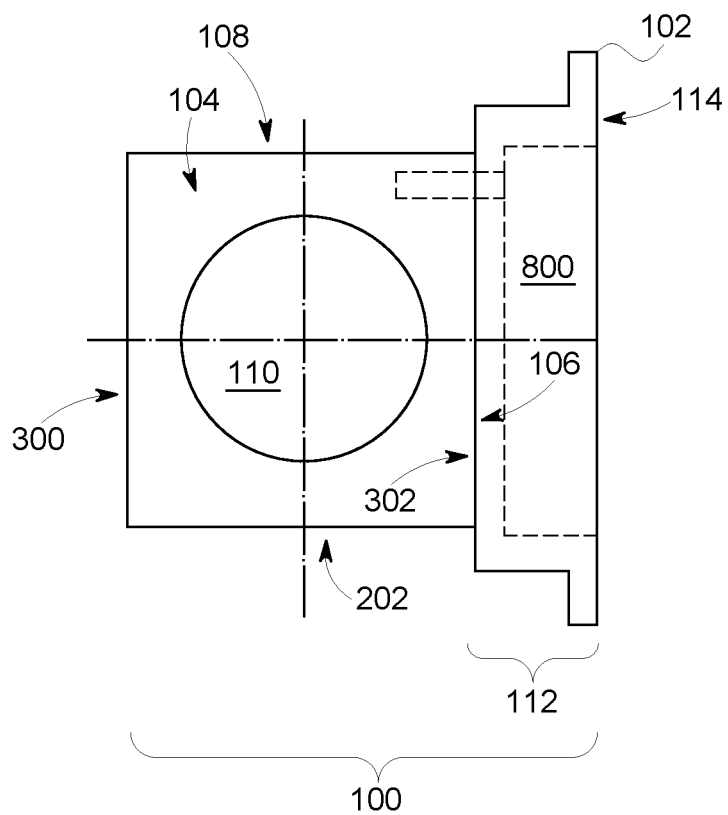
FIG. 9 illustrates the right view of the sensor assembly shown in FIG. 1 with the sensor cap also shown in FIG. 1 removed according to one embodiment.
Figure 10:
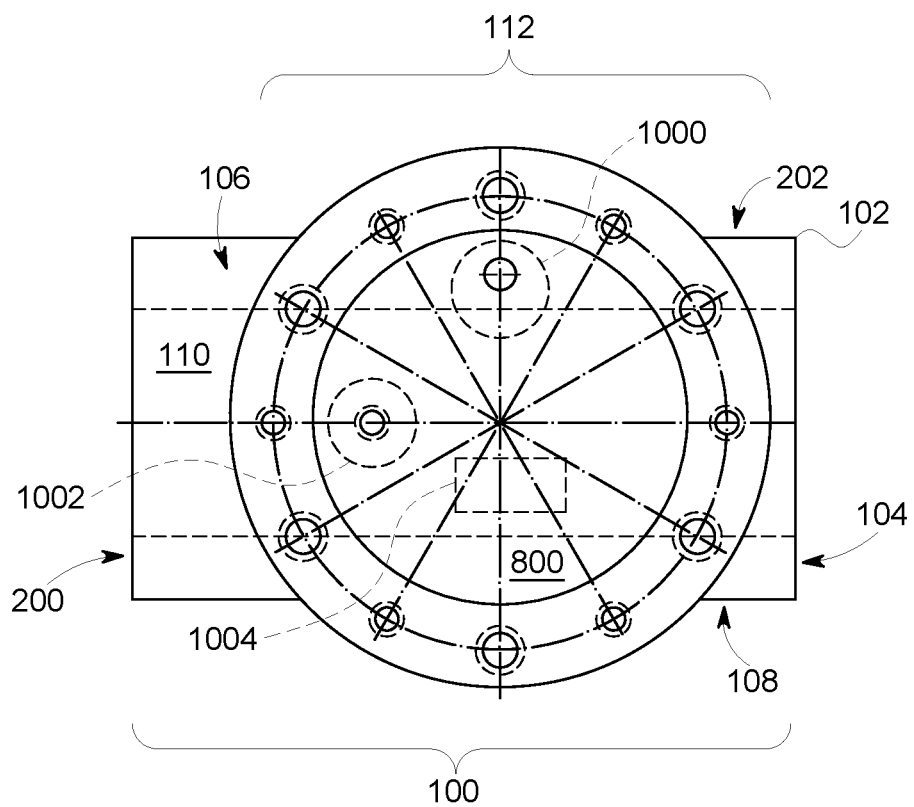
FIG. 10 illustrates a front view of the sensor assembly shown in FIG. 1 with the sensor cap shown in FIG. 1 removed according to one embodiment.

FIG. 8 illustrates a perspective view of the sensor assembly 100 shown in FIG. 1 with the sensor cap 118 removed according to one embodiment. FIG. 9 illustrates the right view of the sensor assembly 100 shown in FIG. 1 with the sensor cap 118 removed according to one embodiment. FIG. 10 illustrates a front view of the sensor assembly 100 shown in FIG. 1 with the sensor cap 118 removed according to one embodiment. The sensor dish 112 of the housing 102 includes an internal chamber 800 where one or more sensors 1000, 1002 (shown in FIG. 10) of the sensor assembly 100 may be located. The internal chamber 800 is enclosed by the housing 102 and the sensor cap 118 when the sensor cap 118 is coupled with the sensor dish 112. While two sensors 1000, 1002 are shown in the illustrated embodiment, alternatively, a single sensor or more than two sensors may be included in the sensor assembly 100. The sensor 1000 may represent a temperature sensor, such as thermocouples or other temperature sensitive elements connected with hardware circuitry that includes and/or is connected with one or more processors (e.g., field programmable gate arrays, integrated circuits, microprocessors, or other electronic logic-based devices). The sensor 1002 may represent a movement sensor, such as an accelerometer or other device that senses movements (e.g., vibrations). The sensor 1002 may be connected with the same or different hardware circuitry as the sensor 1000.

The housing 102 may be formed from one or more materials that are sufficiently rigid and durable to permit the housing 102 to be detachably coupled with a vehicle moving along a route while also protecting the sensors 1000, 1002 disposed in the housing 102. In one embodiment, the housing 102 may be formed from cast steel, such as carbon steel. Alternatively, the housing 102 may be formed from another material. The housing 102 may be relatively large to hold the sensors 1000, 1002 while providing protection to the sensors 1000, 1002. In one embodiment, the housing 102 is approximately five inches long by three and a half inches wide by three and a half inches tall. For example, the housing 102 may be 5.16 inches by 3.625 inches by 3.5 inches. Alternatively, the housing 102 may have one or more other dimensions.

Communication circuitry 1004 may be included in the sensor dish 112. The communication circuitry 1004 can include or represent transceiving or transmitting circuitry, such as a wireless antenna, power source (e.g., battery or connection to an external power source), modem, etc., for wirelessly communicating the data output by the sensors 1000, 1002. The communication circuitry 1004 may communicate the data output by the sensors 1000, 1002, such as the measured temperatures and/or vibrations, to one or more locations outside of the sensor assembly 100, such as a control system that controls movement of the vehicle to which the sensor assembly 100 is connected, a handheld reader that an operator uses to acquire the measurements from the sensors 1000, 1002, one or more wayside devices disposed on or alongside a route for reading data from the sensors 1000, 1002 as the vehicle passes over or by the wayside devices, etc.

Figure 11:
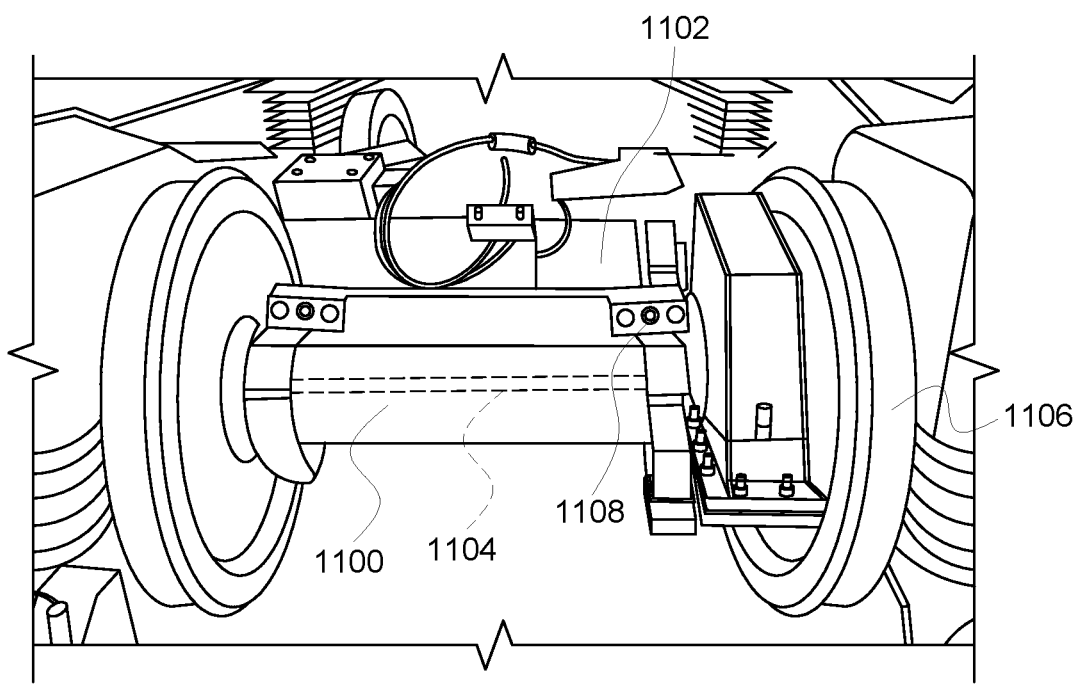
FIG. 11 illustrates a motor assembly according to one embodiment.

FIG. 11 illustrates a motor assembly 1100 according to one embodiment. The motor assembly 1100 may be included in a vehicle, such as a rail vehicle, to generate tractive efforts that propel the vehicle. Alternatively, the motor assembly 1100 may be included in another type of vehicle. The motor assembly 1100 includes a motor 1102, such as a traction motor, that generates torque to rotate an axle 1104 connected with one or more wheels 1106 of the vehicle. The torque generated by the motor 1102 rotates the axle 1104 and wheels 1106 to propel the vehicle.

The motor assembly 1100 includes a U-tube structure 1108 on the exterior of the motor assembly 1100. The U-tube structure 1108 may be used to lift the motor assembly 1100 from the ground, as described below. In one embodiment, the sensor assembly 100 may be connected with the U-tube structure 1108 of the motor assembly 1100 to measure temperatures and/or vibrations of the motor assembly 1100 during movement of the motor assembly 1100.

Figure 12:
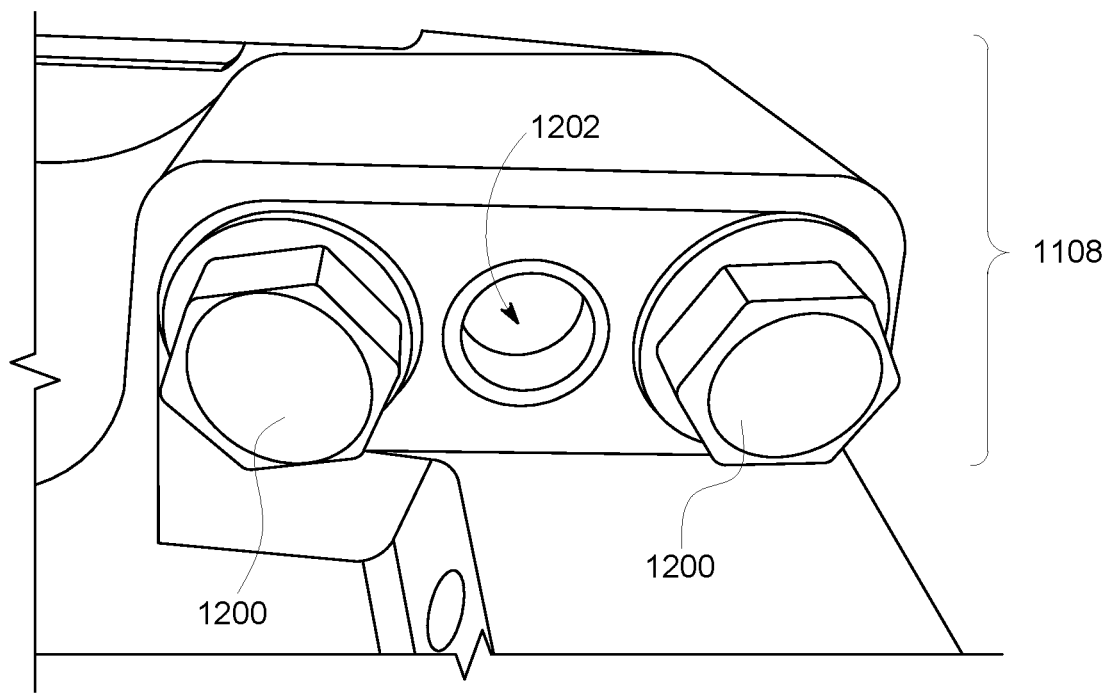
FIG. 12 illustrates a U-tube structure shown in FIG. 11 of the motor assembly also shown in FIG. 11 according to one embodiment.

FIG. 12 illustrates the U-tube structure 1108 of the motor assembly 1100 shown in FIG. 11 according to one embodiment. The U-tube structure 1108 includes a U-tube 1200 with a jacking hole 1202 disposed between the U-tube 1200. The jacking hole 1202 is an opening into the U-tube structure 1108 that a jack may be inserted. The jack can be inserted into the jacking hole 1202 in order to lift the motor assembly 1100. During movement of the vehicle that includes the motor assembly 1100, the jacking hole 1202 is not used and may be empty. At least one embodiment of the sensor assembly 100 described herein may be connected to the motor assembly 1100 in the jacking hole 1202. In one embodiment, the size of the channel in the housing 102 of the sensor assembly 100 is sufficiently large to allow for a screw or bolt that meshes with the threads of the jacking hole 1202 to pass through the channel. For example, the channel may have a diameter of at least 1.25 inches to permit a bolt having a diameter of 1.25 inches to pass through the channel. Alternatively, the channel may have a diameter of at least 1.375 inches (or another size) to allow for some clearance between the channel and the bolt.

Figure 13:
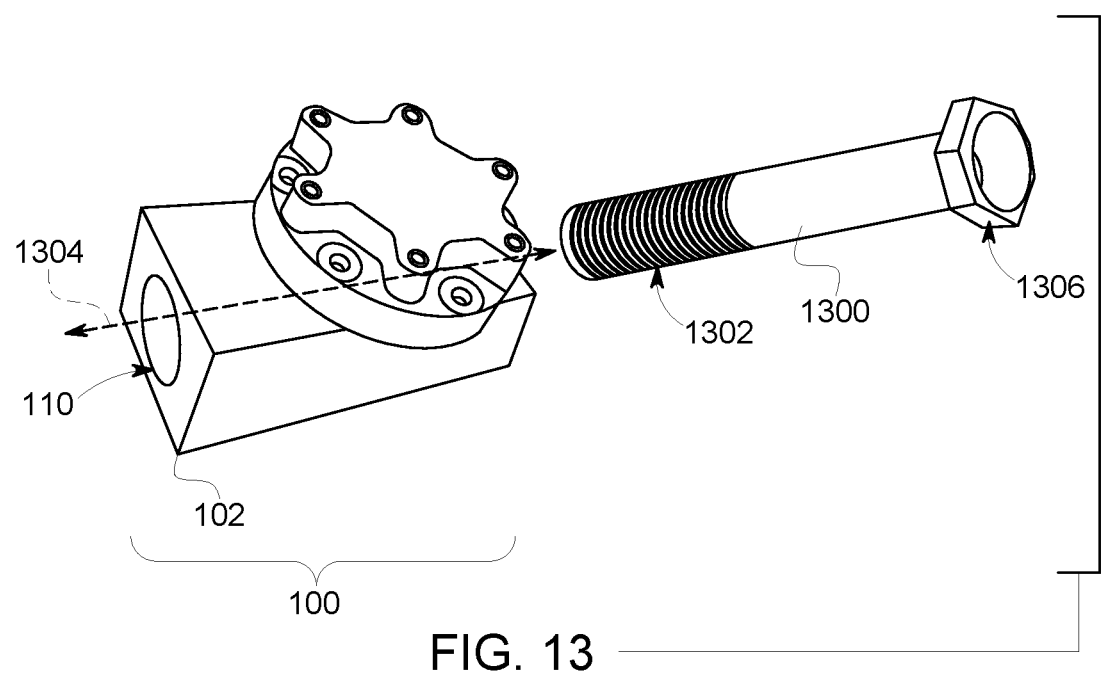
FIG. 13 illustrates an exploded view of the sensor assembly shown in FIG. 1 and a connector used to couple the sensor assembly to the motor assembly shown in FIG. 11 according to one example.

FIG. 13 illustrates an exploded view of the sensor assembly 100 and a connector 1300 used to couple the sensor assembly 100 to the motor assembly 1100 shown in FIG. 11 according to one example. The connector 1300 may be an elongated bolt or other device that extends through the connector channel 110 of the sensor assembly 100. The connector channel 110 may have an axis 1304 that the connector 1300 is inserted along into the sensor assembly 100. In the illustrated embodiment, the connector 1300 includes one or more threads 1302 for securing the connector 1300 to one or more corresponding threads in the jacking hole 1202 (shown in FIG. 12) of the motor assembly 1100. As described above, the sensor assembly 100 may not include threads that engage the threads 1302 of the connector 1300. Instead, the sensor assembly 100 may not be secured to a particular location or orientation around the circumference of the connector 1300. This can enable an operator to change the orientation of the sensor assembly 100 relative to the motor assembly 1100 by rotating the sensor assembly 100 around the connector 1300 and the axis 1304. The connector 1300 can engage with the threads in the jacking hole 1202 to secure the sensor assembly 100 between a head 1306 of the connector 1300 and the U-tube structure 1108.

In one embodiment, the housing 102 and the sensor dish 112 are integrally formed from a common material (e.g., steel), and the channel 110 has a diameter of at least 1.25 inches and a shank (e.g., elongated body that does not include the head) of the connector 1300 corresponds in size to the diameter of the channel 110.

Figure 14:
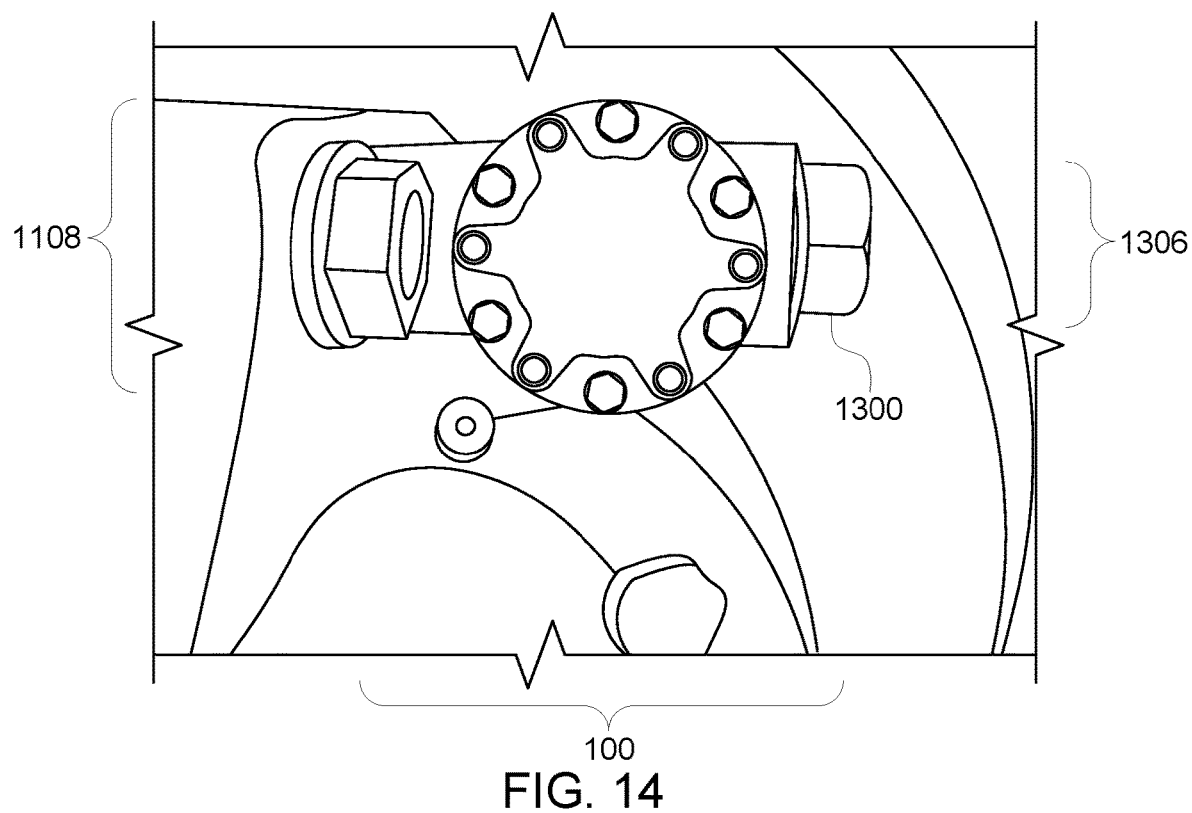
FIG. 14 illustrates the sensor assembly shown in FIG. 1 connected to the U-tube structure of the motor assembly shown in FIG. 1 according to one embodiment.

FIG. 14 illustrates the sensor assembly 100 connected to the U-tube structure 1108 of the motor assembly 1100 shown in FIG. 1 according to one embodiment. As shown in FIG. 14, the connector 1300 is connected to the U-tube structure 1108 through the jacking hole such that the sensor assembly 100 is held between the head of the connector 1300 and the U-tube structure 1108. The sensor assembly 100 is secured to the U-tube structure 1108 such that vibrations, temperatures, or other conditions of the U-tube structure 1108 and/or the motor assembly 1100 are experienced and/or measured by the sensor assembly 100.

Figure 15:
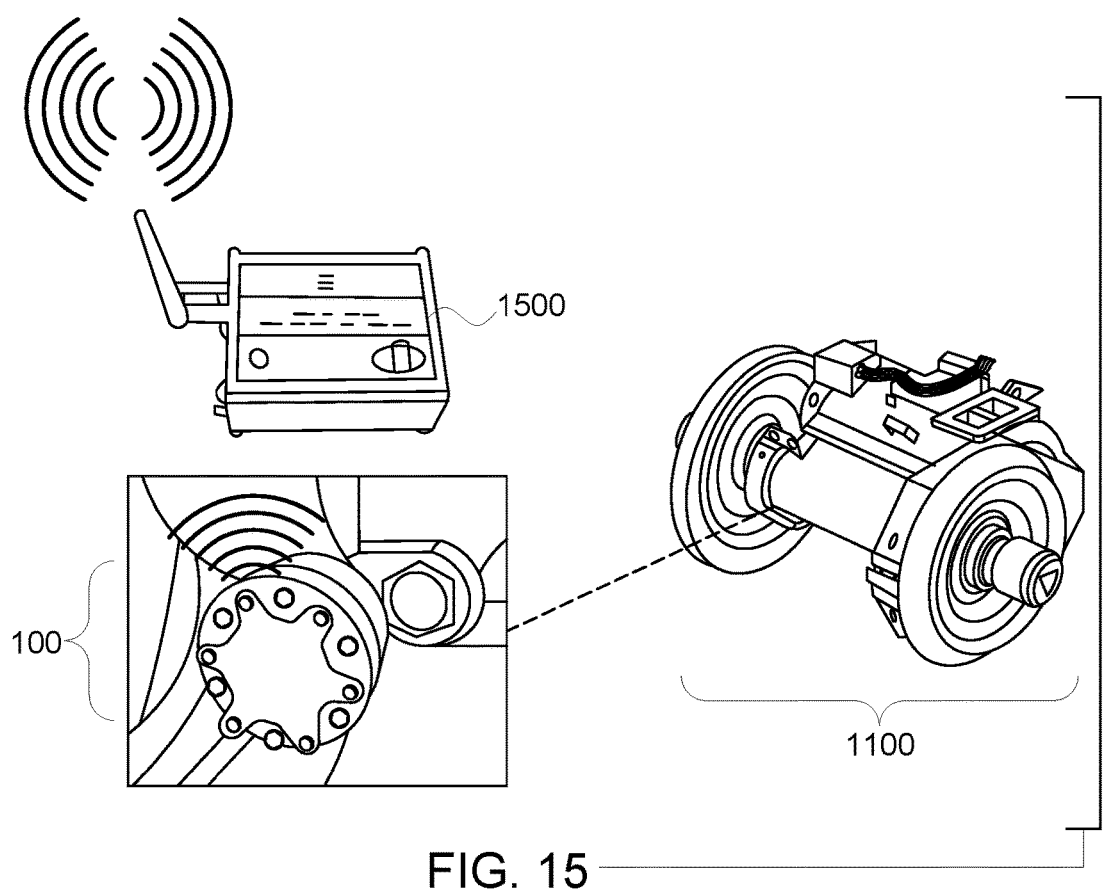
FIG. 15 illustrates operation of the sensor assembly shown in FIG. 1 according to one embodiment.

FIG. 15 illustrates operation of the sensor assembly 100 according to one embodiment. The sensor assembly 100 is connected with the motor assembly 1100 and senses vibrations, temperatures, or other conditions of the motor assembly 1100 during operation of the motor assembly 1100 (e.g., during travel of the vehicle that is propelled by the motor assembly 1100). The sensor assembly 100 may wirelessly communicate the sensed conditions of the motor assembly 1100 to one or more monitoring devices 1500, such as a wireless gateway. The wireless gateway can include or represent hardware circuitry that includes and/or is connected with one or more processors (e.g., field programmable gate arrays, integrated circuits, microprocessors, or other electronic logic-based devices). The monitoring device 1500 can be onboard the vehicle that includes the sensor assembly 100 or may be off-board the vehicle. The monitoring device 1500 can use the sensed conditions to control operation of the vehicle, to determine if a component (e.g., motor) is damaged, to predict damage to the component, etc.

Figure 16:
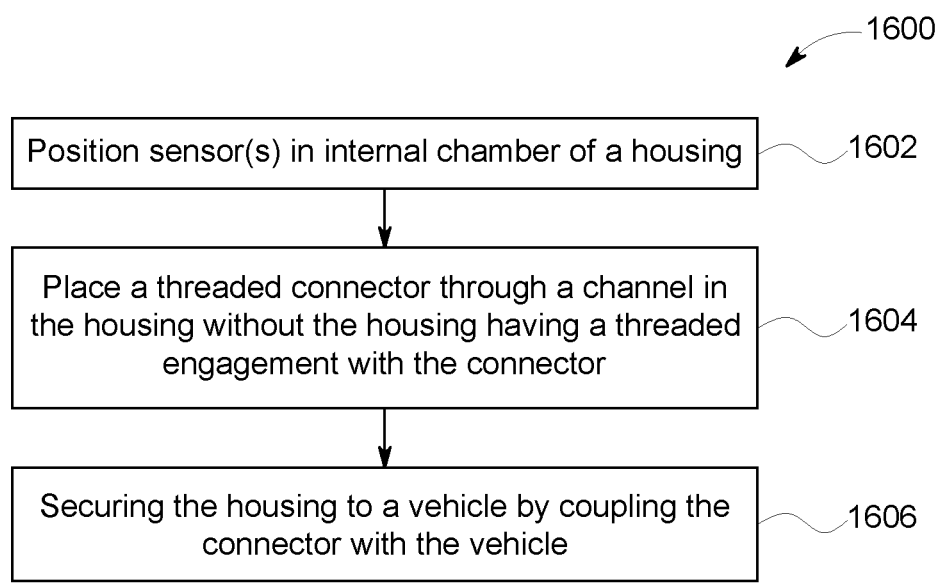
FIG. 16 illustrates a flowchart of one embodiment of a method for providing a sensor assembly.

FIG. 16 illustrates a flowchart of one embodiment of a method 1600 for providing a sensor assembly. The method 1600 may be used to provide (e.g., manufacture) the sensor assembly 100 described above. At 1602, one or more sensors are positioned inside an internal chamber of a housing. The sensors may be capable of measuring operational conditions or characteristics of a vehicle, such as vibrations, temperatures, etc. The housing may include a radio frequency (RF) transparent component (e.g., cap) to allow for wireless communication of data to and/or from the sensors inside the housing. This can allow for the sensors to remain protected from external conditions while the sensors communicate data indicative of sensed conditions or operations to one or more locations outside of the housing.

At 1604, a threaded connector is placed through a channel in the housing without the housing having a threaded engagement with the connector. The channel may be an opening through the housing that does not include corresponding or matching threads. This allows for a threaded connector to extend through the channel without being secured to the housing in any particular orientation. For example, the housing can rotate around the connector and/or the connector can rotate within the housing without the housing rotating the connector or the connector rotating the housing. At 1606, the housing is secured to the vehicle by coupling the connector to the vehicle. The threads of the connector may engage corresponding threads in or on the vehicle to secure the connector to the vehicle and to secure the housing against the vehicle. Because the connector extends through the housing without the threads of the connector being coupled with threads of the housing, the housing is free to be moved relative to the connector to ensure that the sensors are positioned for sensing the operational conditions of the vehicle while remaining secured to the vehicle.

In one embodiment, a sensor assembly includes a housing extending from an insertion end to an opposite coupling end, extending from a sensor end to an opposite back end, and from a top end to an opposite bottom end. Each of the sensor end, the back end, the top end, and the bottom end intersects both the insertion end and the coupling end. The housing also includes a channel extending through the housing from the insertion end to the coupling end. The channel is configured to receive a connector that extends through the channel and connects with a vehicle to secure the housing to the vehicle. The assembly also includes a sensor dish outwardly projecting from the sensor end of the housing. The sensor dish has one or more sensors disposed therein configured to measure one or more operational conditions of the vehicle. The assembly also includes a radio frequency (RF) transparent sensor cap configured to be secured to the sensor dish to secure the one or more sensors within the sensor dish, and communication circuitry disposed in the sensor dish and configured to wirelessly communicate data output by the one or more sensors outside of the housing.

In one embodiment, a vehicle includes a motor assembly having a jacking hole, and the sensor assembly recited above, where the housing is affixed to the motor assembly with the connector extending through the channel and into the jacking hole.

Optionally, the housing and sensor dish are integrally formed from a common material (the material comprising steel), and the channel has a diameter of at least 1.25 inches and a shank of the connector corresponds in size to the diameter of the channel.

In one embodiment, a sensor assembly includes one or more sensors configured to measure one or more operational conditions of a vehicle and a housing extending from an insertion end to an opposite coupling end and having an internal chamber configured to hold the one or more sensors. The housing also includes a channel extending through the housing from the insertion end to the coupling end. The channel is configured to receive a connector that extends through the channel and connects with the vehicle to secure the housing to the vehicle.

Optionally, the one or more sensors include an accelerometer.

Optionally, the one or more sensors include a temperature sensor.

Optionally, the sensor assembly includes communication circuitry configured to be disposed in the internal chamber of the housing and configured to wirelessly communicate data output by the one or more sensors outside of the housing.

Optionally, the housing is configured to receive the connector through the channel for securing the connector to a jacking hole of a motor assembly of the vehicle.

Optionally, the channel of the housing is threadless.

Optionally, the housing also extends from a sensor end to an opposite back end, with each of the sensor end and the back end intersecting both the insertion end and the coupling end of the housing. The housing can include a sensor dish having the internal chamber. The sensor dish can outwardly project from the sensor end of the housing.

Optionally, the housing can include a radio frequency (RF) transparent sensor cap configured to be secured to the sensor dish to enclose the one or more sensors within the internal chamber.

In one embodiment, a sensor assembly includes a housing extending from an insertion end to an opposite coupling end, extending from a sensor end to an opposite back end, and from a top end to an opposite bottom end. Each of the sensor end, the back end, the top end, and the bottom end intersects both the insertion end and the coupling end. The assembly also includes a sensor dish outwardly projecting from the sensor end of the housing. The sensor dish is configured to hold one or more sensors. The assembly also includes a radio frequency (RF) transparent sensor cap configured to be secured to the sensor dish to secure the one or more sensors within the sensor dish. The housing also can be configured to be secured to a vehicle for the one or more sensors to measure one or more operational conditions of the vehicle.

Optionally, the housing also can include a channel extending through the housing from the insertion end to the coupling end. The channel can be configured to receive a connector that extends through the channel and connects with the vehicle to secure the housing to the vehicle.

Optionally, the housing can be configured to receive the connector through the channel for securing the connector to a jacking hole of a motor assembly of the vehicle.

Optionally, the channel of the housing is threadless.

Optionally, the assembly can include the one or more sensors, where the one or more sensors include an accelerometer.

Optionally, the assembly includes the one or more sensors, and the one or more sensors include a temperature sensor.

Optionally, the assembly also can include communication circuitry configured to be disposed in the sensor dish and configured to wirelessly communicate data output by the one or more sensors outside of the housing.

In one embodiment, a sensor assembly includes a housing that is elongated from an insertion end to an opposite coupling end. The insertion end is configured to receive a connector into a channel extending through the housing from the insertion end to the coupling end. The coupling end is configured to engage a motor assembly of a vehicle to which the connector secures the housing. The channel of the housing is configured to receive the connector without being secured to one or more threads of the connector. The assembly can include one or more sensors configured to measure one or more operational conditions of the vehicle.

Optionally, the one or more sensors can include an accelerometer.

Optionally, the one or more sensors can include a temperature sensor.

Optionally, the assembly also can include communication circuitry configured to be disposed in the internal chamber of the housing and configured to wirelessly communicate data output by the one or more sensors outside of the housing.

Optionally, the housing is configured to receive the connector through the channel for securing the connector to a jacking hole of the motor assembly of the vehicle.

In one embodiment, a sensor assembly kit includes a connector, one or more sensors configured to measure one or more operational conditions of a vehicle, and a housing extending from an insertion end to an opposite coupling end and having an internal chamber configured to hold the one or more sensors. The housing also includes a channel extending through the housing from the insertion end to the coupling end. The channel is configured to receive the connector. The connector is configured to extend through the channel and connect with an existing aperture in the vehicle to detachably secure the housing to the vehicle.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "an embodiment" or "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

As used herein, a structure, limitation, or element that is "configured to" perform a task or operation is particularly structurally formed, constructed, programmed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, programming of the structure or element to perform the corresponding task or operation in a manner that is different from an "off-the-shelf" structure or element that is not programmed to perform the task or operation, and/or denotes structural requirements of any structure, limitation, or element that is described as being "configured to" perform the task or operation.

What is claimed is:

1. A sensor assembly comprising:
   a housing extending from an insertion end that is configured to receive a connector to an opposite coupling end, the housing including a sensor end;
   a sensor dish outwardly projecting from the sensor end of the housing, the sensor dish having a container in which one or more sensors are disposed; and
   a radio frequency (RF) transparent sensor cap configured to be secured to the sensor dish to secure the one or more sensors within the sensor dish, wherein the coupling end of the housing is configured to be secured against a component of a vehicle for the one or more sensors to measure one or more operational conditions of the vehicle;

wherein the housing is configured to receive the connector through a channel of size and shape for securing the connector to a jacking hole of the component of the vehicle, wherein the housing also includes the channel extending through the housing from the insertion end to the coupling end, the channel configured to receive a connector that extends through the channel and connects with the vehicle to secure the housing to the vehicle.

2. The sensor assembly of claim 1, wherein the one or more sensors include one or more of an accelerometer or a temperature sensor.

3. The sensor assembly of claim 2, further comprising:
communication circuitry configured to be disposed in the sensor dish and configured to wirelessly communicate data that is output by the one or more sensors to a location outside of the housing.

4. The sensor assembly of claim 1, wherein the housing also extends from a sensor end to an opposite back end and from a top end to an opposite bottom end.

5. The sensor assembly of claim 4, wherein each of the insertion end, the coupling end, the sensor end, the back end, the top end, and the bottom end is a planar surface.

6. The sensor assembly of claim 4, wherein each of the sensor end, the back end, the top end, and the bottom end intersects both the insertion end and the coupling end.

7. A sensor assembly comprising:
a housing that is elongated from an insertion end that is configured to receive a connector to an opposite coupling end, the housing having a sensor end that extends from the insertion end to the coupling end, the housing having a sensor dish outwardly projecting from the sensor end, the sensor dish having a container in which sensors are disposed, the insertion end shaped to receive the connector into a channel extending through the housing from the insertion end to the coupling end, the coupling end shaped to engage a component of a vehicle to which the connector secures the housing, wherein the channel of the housing is shaped to receive the connector without being secured to one or more threads of the connector; and
one or more sensors configured to measure one or more operational conditions of the vehicle;
wherein the housing is configured to receive the connector through the channel of size and shape for securing the connector to a jacking hole of the component of the vehicle.

8. The sensor assembly of claim 7, wherein the one or more sensors include an accelerometer.

9. The sensor assembly of claim 7, wherein the one or more sensors include a temperature sensor.

10. The sensor assembly of claim 7, further comprising communication circuitry configured to be disposed in the housing and configured to wirelessly communicate data output by the one or more sensors to a location outside of the housing.

11. The sensor assembly of claim 7, wherein the channel is elongated and has a first length that is less than a second length of the connector such that one end of the connector protrudes out of the insertion end of the housing and an opposite end of the connector protrudes out of the coupling end of the housing while the connector extends through the channel and secures the housing to the vehicle.

12. A sensor assembly comprising:
a housing extending from a first end to an opposite second end along a first direction, the housing extending from a third end to an opposite fourth end along a second direction that is different than the first direction, the housing having a connector channel extending entirely through the housing from the first end to the second end, the housing including a sensor container on the third end and disposed between the first end and the second end, the sensor container configured to hold one or more sensors, the sensor container extending from a front surface to an opposite, second surface with a first distance from the front surface to the second surface of the sensor container being shorter than a second distance that the housing extends from the first end to the second end;
a radio frequency (RF) transparent cap configured to couple with the housing on the third end of the housing to enclose the one or more sensors within the sensor container; and
a threaded connector configured to extend through the connector channel of the housing and couple the housing with a component of a vehicle.

13. The sensor assembly of claim 12, further comprising the one or more sensors that include one or more of a temperature sensor or a movement sensor.

14. The sensor assembly of claim 12, further comprising RF communication circuitry disposed in the sensor container, the RF communication circuitry configured to wirelessly communicate data from the one or more sensors to a location outside of the housing.

15. The sensor assembly of claim 12, further comprising, RF communication circuitry disposed in the sensor container, the RF communication circuitry configured to wirelessly communicate data from the one or more sensors and through the RF transparent cap to a location that is off-board the vehicle.

16. The sensor assembly of claim 12, wherein the threaded connector extends through the connector channel without engaging threads within the connector channel to permit the housing to be rotated relative to the threaded connector without moving the threaded connector relative to the component of the vehicle.

17. The sensor assembly of claim 12, wherein the threaded connector is shaped to extend through the connector channel and couple with a jacking hole in the component of the vehicle.

18. The sensor assembly of claim 12, wherein the housing includes multiple opposing pairs of planar outer surfaces.

19. The sensor assembly of claim 12, wherein the connector channel is a threadless channel.

\* \* \* \* \*